(12) United States Patent
Tsai (10) Patent No.: US 11,966,531 B2
(45) Date of Patent: Apr. 23, 2024

(54) CAPACITIVE SENSING DEVICE AND CAPACITIVE SENSING METHOD

(71) Applicant: REALTEK SEMICONDUCTOR CORPORATION, Hsinchu (TW)

(72) Inventor: Hsu-Ming Tsai, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 18/197,750

(22) Filed: May 16, 2023

(65) Prior Publication Data

US 2023/0393693 A1    Dec. 7, 2023

(30) Foreign Application Priority Data

Jun. 1, 2022 (TW) .................................. 111120516

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0418* (2013.01); *G06F 2203/04107* (2013.01); *G06F 2218/04* (2023.01)

(58) Field of Classification Search
CPC ...... G06F 3/0416; G06F 3/044; G06F 3/0418; G06F 2203/04107; G06F 2218/04
See application file for complete search history.

(56) References Cited

U.S. PATENT DOCUMENTS

| 8,729,913 | B2* | 5/2014 | Maharyta | G06F 3/0446 324/658 |
| 8,810,546 | B1* | 8/2014 | Kremin | G06F 3/0446 345/174 |
| 9,092,098 | B2* | 7/2015 | Konovalov | G06F 3/0418 |
| 9,151,792 | B1 | 10/2015 | Kremin et al. | |
| 9,274,154 | B2* | 3/2016 | Togura | H03K 17/955 |
| 9,823,798 | B2 | 11/2017 | Cholasta | |
| 9,958,993 | B2* | 5/2018 | Akhavan Fomani | G06F 3/0412 |
| 10,521,032 | B2* | 12/2019 | Takahashi | G06F 3/041 |
| 11,481,060 | B2* | 10/2022 | Bagheri | G06F 3/0414 |

(Continued)

FOREIGN PATENT DOCUMENTS

| CN | 106598370 A | 4/2017 |
| CN | 107092407 A | 8/2017 |

*Primary Examiner* — Michael J Jansen, II
(74) *Attorney, Agent, or Firm* — WPAT, P.C (57) ABSTRACT

A capacitive sensing device includes a switch circuitry, a counter circuit, a comparator circuit, an amplifier circuit including first and second input terminals and an output terminal, and a feedback capacitor coupled between the output terminal and the first input terminal. The switch circuitry transmits a reference voltage to the second input terminal and couples the first input terminal to the output terminal during a first phase, transmits another reference voltage to the second input terminal during a second phase, and adjusts a voltage of the output terminal during a third phase. The counter circuit starts counting and the comparator circuit generates the control signal according to the output voltage and the second reference voltage during the third phase. The counter circuit stops counting according to the control signal to generate a count value indicating a capacitance value change of a capacitor under-test coupled to the first input terminal.

20 Claims, 6 Drawing Sheets

(56) References Cited

U.S. PATENT DOCUMENTS

| | | | |
|---|---|---|---|
| 2012/0049868 A1* | 3/2012 | Maharyta | G06F 3/0446 |
| | | | 324/679 |
| 2012/0268415 A1* | 10/2012 | Konovalov | G06F 3/0418 |
| | | | 345/174 |
| 2013/0207677 A1* | 8/2013 | Togura | G01R 35/00 |
| | | | 324/685 |
| 2015/0317028 A1* | 11/2015 | Takahashi | G06F 3/04166 |
| | | | 345/173 |
| 2017/0003777 A1* | 1/2017 | Akhavan Fomani | |
| | | | G06F 3/0445 |
| 2020/0220543 A1 | 7/2020 | Chang et al. | |
| 2021/0055832 A1* | 2/2021 | Bagheri | G06F 3/0445 |

* cited by examiner

CAPACITIVE SENSING DEVICE AND CAPACITIVE SENSING METHOD

BACKGROUND OF THE INVENTION

1. Field of the Invention

The present disclosure relates to a capacitive sensing device. More particularly, the present disclosure relates to a capacitive sensing device and a capacitive sensing method that are able to sense a capacitance value change of a touch element.

2. Description of Related Art

Touch devices are widely employed in various electronic products. A touch element connected to a specific level (e.g., ground) is employed in a self-capacitive touch device to receive a touch input. In some related approaches, a capacitive sensing circuit has a higher circuit complexity, and the capacitive sensing circuit may utilize an amplifier to directly amplify a change of charges on the touch element, and the signal generated by the amplifier is directly output as a sensing signal. However, in these approaches, the amplifier may amplify noises in the system and thus the output of the amplifier may be oversaturated. As a result, operations of the capacitive sensing circuit will fail, and the capacitive sensing circuit will not be able to effectively identify whether the touch input is received.

SUMMARY OF THE INVENTION

In some aspects, an object of the present disclosure is to, but not limited to, provide capacitive sensing device and method that utilize a counter to check a capacitance value change, in order to make an improvement to the prior art.

In some aspects, a capacitive sensing device includes an amplifier circuit, a feedback capacitor, a switch circuitry, a counter circuit, and a comparator circuit. A first input terminal of the amplifier circuit is coupled to a capacitor under-test. The feedback capacitor is coupled between the first input terminal and an output terminal of the amplifier circuit. The switch circuitry is configured to transmit a first reference voltage to a second input terminal of the amplifier circuit and couple the first input terminal to the output terminal during a first phase, transmit a second reference voltage to the second input terminal during a second phase, and adjust an output voltage of the output terminal during a third phase. The counter circuit is configured to start counting during the third phase and stop counting according to a control signal to generate a count value, in which the count value indicates a capacitance value change of the capacitor under-test. The comparator circuit is configured to generate the control signal according to the output voltage and the second reference voltage during the third phase.

In some aspects, a capacitive sensing method includes the following operations: transmitting a first reference voltage to a first input terminal of an amplifier circuit and coupling a second input terminal of the amplifier circuit to an output terminal the amplifier circuit during a first phase, in which the second input terminal is coupled to the output terminal via a switch circuitry and is coupled to ground via a capacitor under-test; transmitting a second reference voltage to the first input terminal during a second phase; adjusting an output voltage of the output terminal and generating a control signal according to the output voltage and the second reference voltage during a third phase; and starting counting when entering the third phase and stopping counting according to the control signal to generate a count value, in which the count value indicates a capacitance value change of the capacitor under-test.

These and other objectives of the present disclosure will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

In this document, the term "coupled" may also be termed as "electrically coupled," and the term "connected" may be termed as "electrically connected." "Coupled" and "connected" may mean "directly coupled" and "directly connected" respectively, or "indirectly coupled" and "indirectly connected" respectively. "Coupled" and "connected" may also be used to indicate that two or more elements cooperate or interact with each other. In this document, the term "circuitry" may indicate a system implemented with at least one circuit, and the term "circuit" may indicate an object, which is formed with one or more transistors and/or one or more active/passive elements based on a specific arrangement, for processing signals.

As used herein, the term "and/or" includes any and all combinations of one or more of the associated listed items. Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. For ease of understanding, similar/identical elements in various figures are designated with the same reference number.

Figure 1:
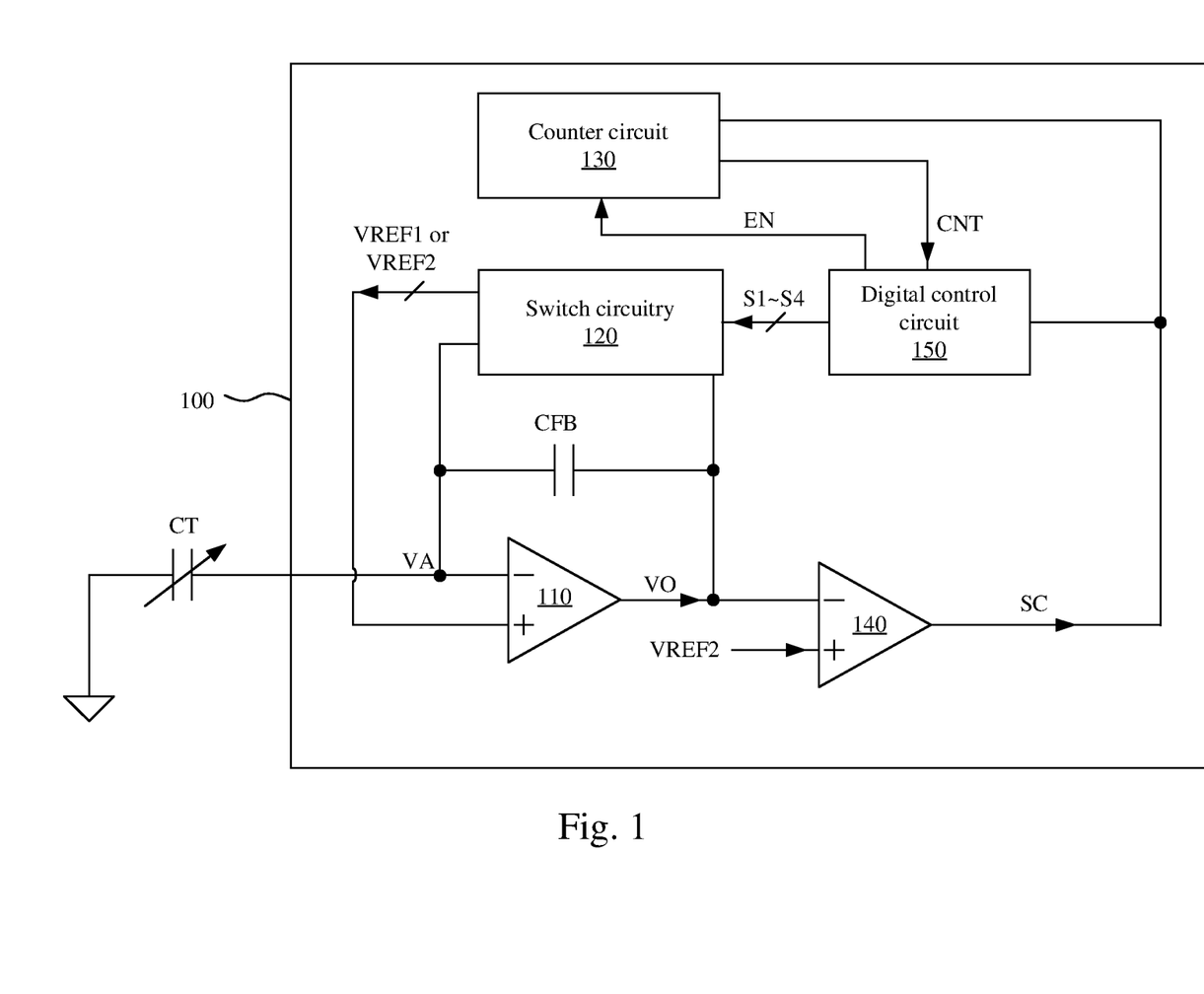
FIG. 1 illustrates a schematic diagram of a capacitive sensing device according to some embodiments of the present disclosure.

FIG. 1 illustrates a schematic diagram of a capacitive sensing device 100 according to some embodiments of the present disclosure. In some embodiments, the capacitive sensing device 100 may sense a capacitance value change of a capacitor under-test CT. In some embodiments, the capacitor under-test CT may be, but not limited to, a touch element in a touch screen. For example, the capacitor under-test CT may be a self-capacitive touch element. The capacitive sensing device 100 may sense whether a capacitance value of the capacitor under-test CT changes, in order to determine whether the capacitor under-test CT is touched.

In some embodiments, the capacitive sensing device 100 includes an amplifier circuit 110, a switch circuitry 120, a counter circuit 130, a comparator circuit 140, a digital control circuit 150, and a feedback capacitor CFB. A first input terminal of the amplifier circuit 110 (e.g., a negative input terminal) is coupled to the capacitor under-test CT, and another terminal of the capacitor under-test CT is coupled to ground. A second terminal of the amplifier circuit 110 (e.g., a positive input terminal) is coupled to the switch circuitry 120, in order to sequentially receive a reference voltage VREF1 and a reference voltage VREF2 during different phases. The feedback capacitor CFB is coupled between the negative input terminal and an output terminal of the amplifier circuit 110.

During a first phase (e.g., a phase P1 in FIG. 2B or FIG. 3B), the switch circuitry 120 transmits the reference voltage VREF1 to the positive input terminal of the amplifier circuit 110, and couples the negative input terminal of the amplifier circuit 110 to the output terminal of the amplifier circuit 110. The switch circuitry 120 transmits the reference voltage VREF2 to the positive input terminal of the amplifier circuit 110 during a second phase (e.g., a phase P2 in FIG. 2B or FIG. 3B), and adjusts an output voltage VO of the output terminal of amplifier circuit 110 during a third phase (e.g., a phase P3 in FIG. 2B or FIG. 3B). In some embodiments, the switch circuitry 120 may perform the above operations during different phases according to signals S1-S4.

The counter circuit 130 starts counting during the third phase, and stops counting according to a control signal SC to output a count value CNT which indicates the capacitance value change of the capacitor under-test CT.

The comparator circuit 140 generates the control signal SC according to the output voltage VO and the reference voltage VREF2 during the third phase. In this embodiment, the comparator circuit 140 detects whether the output voltage VO is lower than or equal to the reference voltage VREF2, and generates the control signal SC when the output voltage VO is lower than or equal to the reference voltage VREF2. During the third phase, the digital control circuit 150 may generate the signals S1-S4 according to the control signal SC, and determine whether the capacitance value of the capacitor under-test CT changes according to the count value CNT. For example, the digital control circuit 150 may determine whether to switch the signals S1-S4 according to the control signal SC during the third phase, and generates an enable signal EN to control the counter circuit 130 to start counting when entering the third phase. If the count value CNT exceeds a predetermined range (or is different from a predetermined value), the digital control circuit 150 may determine that the capacitance value of the capacitor under-test CT changes (i.e., the capacitor under-test CT is being touched). In some embodiments, the digital control circuit 150 may be, but not limited to, implemented with logic circuits that perform a finite stage machine or a digital signal processing circuit.

Figure 2A:
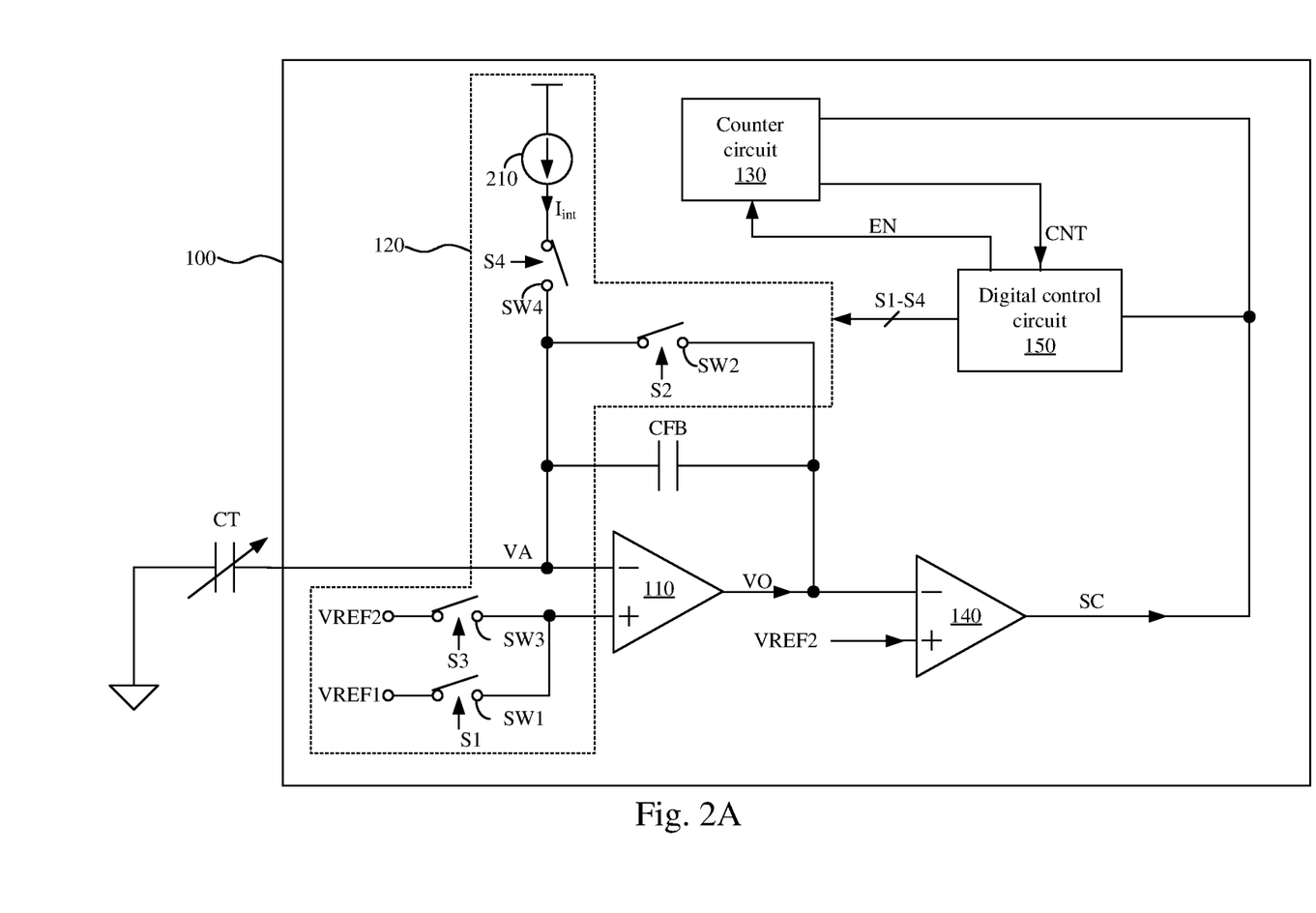
FIG. 2A illustrates a circuit diagram of the capacitive sensing device in FIG. 1 according to some embodiments of the present disclosure.

FIG. 2A illustrates a circuit diagram of the capacitive sensing device 100 in FIG. 1 according to some embodiments of the present disclosure. In this example, the reference voltage VREF1 is lower than the reference voltage VREF2, and the switch circuitry 120 is configured to transmit a current $I_{int}$ to the negative input terminal of the amplifier circuit 110 during the third phase, in order to adjust the output voltage VO.

In greater detail, the switch circuitry 120 includes switches SW1-SW4 and a current source circuit 210. A first terminal of the switch SW1 receives the reference voltage VREF1, a second terminal of the switch SW1 is coupled to the positive input terminal of the amplifier circuit 110, and a control terminal of the switch SW1 (not shown) receives the signal S1. The switch SW1 is turned on according to the signal S1 during the first phase, in order to transmit the reference voltage VREF1 to the positive input terminal of the amplifier circuit 110. A first terminal of the switch SW2 is coupled to the negative input terminal of the amplifier circuit 110, a second terminal of the switch SW2 is coupled to the output terminal of the amplifier circuit 110, and a control terminal of the switch SW2 (not shown) receives the signal S2. The switch SW2 is turned on according to the signal S2 during the first phase, in order to couple the negative input terminal of the amplifier circuit 110 to the output terminal of the amplifier circuit 110. In other words, when the switch SW2 is turned on, the negative input terminal and the output terminal of the amplifier circuit 110 have the same level. A first terminal of the switch SW3 receives the reference voltage VREF2, a second terminal of the switch SW3 is coupled to the positive input terminal of the amplifier circuit 110, and a control terminal of the switch SW3 (not shown) receives the signal S3. The switch SW3 is turned on according to the signal S3 during the second phase, in order to transmit the reference voltage VREF2 to the positive input terminal of the amplifier circuit 110. A first terminal of the switch SW4 is coupled to the current source circuit 210, a second terminal of the switch SW4 is coupled to the negative input terminal of the amplifier circuit 110, and a control terminal of the switch SW4 (not shown) receives the signal S4. The switch SW4 is turned on according to the signal S3 during the third phase, in order to couple the current source circuit 210 to the negative input terminal of the amplifier circuit 110. As a result, the current source circuit 210 may transmit the current $I_{int}$ it to the negative input terminal of the amplifier circuit 110 to adjust the output voltage VO.

Figure 2B:
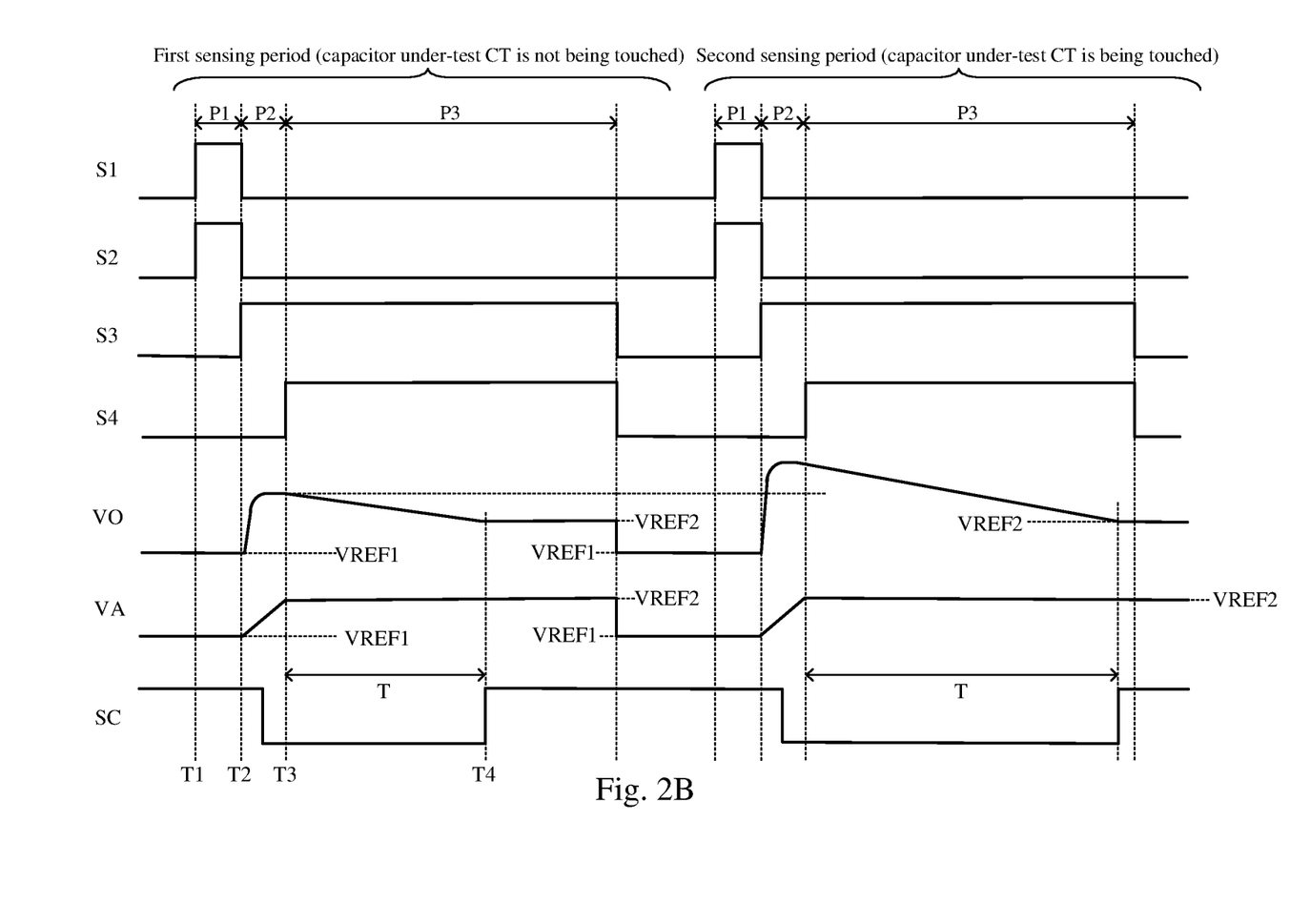
FIG. 2B illustrates a schematic diagram of waveforms of signals and voltages in FIG. 2A according to some embodiments of the present disclosure.

FIG. 2B illustrates a schematic diagram of waveforms of signals and voltages in FIG. 2A according to some embodiments of the present disclosure. For illustrating operations of the capacitive sensing device 100, reference is now made to both of FIG. 2A and FIG. 2B. FIG. 2B shows two consecutive sensing periods, in which the capacitor under-test CT is not being touched during the first sensing period (i.e., the capacitance value is unchanged), and is being touched during the second sensing period (i.e., the capacitance value is changed).

In time T1, the signal S1 and the signal S2 are switched to an enabling level (e.g., a high level). During a phase P1 where the signal S1 and the signal S2 have the enabling level, the switch SW1 and the switch SW2 are turned on. As a result, the switch SW1 transmits the reference voltage VREF1 to the positive input terminal of the amplifier circuit 110, and the switch SW2 couples the negative input terminal of the amplifier circuit 110 to its output terminal. The level of the negative input terminal of the amplifier circuit 110 is equal to that of the positive input terminal of the amplifier circuit 110 due to virtual ground (or virtual short-circuit), such that the levels of the negative input terminal, the positive input terminal, and the output terminal of the amplifier circuit 110 are equal to the reference voltage VREF1, in which the voltage of the negative input terminal of the amplifier circuit 110 is labeled as the voltage VA. With the above operations, during the phase P1, the capacitor under-test CT is charged by the reference voltage VREF1 to store charges amounted to CT×VREF1, a voltage across two terminals of the feedback capacitor CFB is zero, and thus no charges are stored by the feedback capacitor CFB. During the phase P1, the output voltage VO is equal to the reference voltage VREF1, and is thus lower than the reference voltage VREF2. As a result, the comparator circuit 140 outputs the control signal SC having a first level (e.g., high level). As the digital control circuit 150 does not operate according to the control signal SC during the phase P1, the digital control circuit 150 does not operate mistakenly.

In time T2, the signal S1 and the signal S2 are switched to a disabling level (e.g., a low level), and the signal S3 is switched to an enabling level (e.g., a high level). In time T3, the signal S4 is switched the enabling level (e.g., the high level). During the phase P2 between time T2 and time T3, the switch SW1 is not turned on in response to the signal S1, the switch SW2 is not turned on in response to the signal S2, and the switch SW3 is turned on in response to the signal S3. As a result, during the phase P2, the switch SW1 stops transmitting the reference voltage VREF1 to the positive input terminal of the amplifier circuit 110, the switch SW3 transmits the reference voltage VREF2 to the positive input terminal of the amplifier circuit 110, and the negative input terminal of the amplifier circuit 110 is not coupled to the output terminal of the amplifier circuit 110 via the switch SW2. The level of the negative input terminal of the amplifier circuit 110 is pulled to reference voltage VREF2 during the phase P2 due to virtual ground. With the above operations, the capacitor under-test CT is charged by the reference voltage VREF2 to store charges amounted to CT×VREF2, the voltage across the two terminals of the feedback capacitor CFB is a difference between reference voltage VREF2 and the output voltage VO, and thus the feedback capacitor CFB stores charges amounted to CFB×(VREF2−VO). Furthermore, during the phase P2, in response to the above voltage changes, the output voltage VO is higher than the reference voltage VREF2 in a brief period. As a result, the comparator circuit 140 may output the control signal SC having a second level (e.g., a low level). As the digital control circuit 150 does not operate according to the control signal SC during the phase P2, the digital control circuit 150 does not operate mistakenly.

In operations performed during the phases P1 and P2, based on a law of charge conservation, it can be derived that the amount of charges increased in the capacitor under-test CT should be equal to the amount of charges reduced in the feedback capacitor CFB, which may be expressed as the following equation (1):

$$\text{VREF2} \times \text{CT} - \text{VREF1} \times \text{CT} = -(\text{VREF2} - \text{VO}) \times \text{CFB} \qquad (1)$$

Moreover, it is able to derive that the output voltage VO is satisfied with the following equation (2) from the above equation (1):

$$VO = VREF2 + (VREF2 - VREF1) \times \frac{CT}{CFB} \qquad (2)$$

During the phase P3 where the signal S4 has an enabling level (e.g., a high level), the switch SW3 is continuously turned on in response to the signal S3, and the switch SW4 is turned on in response to the signal S4. As a result, the switch SW3 continuously transmits the reference voltage VREF2 to the positive input terminal of the amplifier circuit 110, and the current source circuit 210 may transmit the current $I_{int}$ to the negative input terminal of the amplifier circuit 110 via the switch SW4 to adjust the output voltage VO. When entering the phase P3, the counter circuit 130 may start counting based on the enable signal EN. When the level of the output voltage VO is adjusted to be equal to (or lower than) the reference voltage VREF2 (i.e., time T4), the comparator circuit 140 outputs the control signal SC having the high level. In response to the control signal SC, the counter circuit 130 stops counting and outputs the count value CNT to the digital control circuit 150, in order to determine whether the capacitance value of the capacitor under-test CT changes. In the above operations, the amount of charges stored in the capacitor under-test CT is not changed, and the amount of charges stored in the feedback capacitor CFB is changed from CFB×(VREF2−VO) to CFB×(VREF2−VREF2). Accordingly, based on the law of charge conservation, it can be derived that the changed amount of charges stored in the feedback capacitor CFB should be equal to the amount of charges provided from the current source circuit 210, which can be expressed as the following equation (3), in which T indicates a period from when the switch SW4 starts being turned on (i.e., the current source circuit 210 starts transmitting the current $I_{int}$ to the negative input terminal of the amplifier circuit 110) to when the output voltage VO is adjusted to be equal to (or lower than) the reference voltage VREF2:

$$I_{int} \times T = (\text{VREF2} - \text{VREF2}) \times \text{CFB} - (\text{VREF2} - \text{VO}) \times \text{CFB} \qquad (3)$$

According to the equations (2) and (3), the following equation (4) can be derived:

$$T = (VREF2 - VREF1) \times \frac{CT}{I_{int}} \qquad (4)$$

From the equation (4), it can be derived that, as the reference voltage VREF1, the reference voltage VREF2, and the current $I_{int}$ are all fixed values, the period T is proportional to the capacitance value of the capacitor under-test CT. As the counter circuit 130 starts counting during the phase P3 and stops counting when the output voltage VO is equal to the reference voltage VREF2, the count value CNT generated by the counter circuit 130 may be utilized to indicate the time length of the period T. If the count value CNT does not exceed a predetermined range (or is the same as the predetermined value), it indicates that the capacitor under-test CT is not being touched and thus capacitance value is unchanged. Furthermore, based on the equation (4), it is understood that the time length of the period T is proportional to the voltage difference between the reference voltage VREF1 and the reference voltage VREF2. In other words, the count value CNT is proportional to the voltage difference between the reference voltage VREF1 and the reference voltage VREF2. In some embodiments, the value of the reference voltage VREF1 and that of the reference voltage VREF2 may be adjusted according to practical system requirement(s).

Similarly, during the second sensing period, the capacitive sensing device 100 may perform the same operations again to determine whether the capacitance value of the capacitor under-test CT changes. As mentioned above, during the second sensing period, the capacitor under-test CT is being touched to have a higher capacitance value. Compared with the first sensing period, the output voltage VO is increased to a higher level during the phase P2 in the second sensing period. Accordingly, during the phase P3, it takes more time for the output voltage VO to be decreased to the reference voltage VREF2. As a result, the time length of the period T is longer, and the value of the count value CNT is higher. In other words, the count value CNT is proportional to the change of the capacitance value of the capacitor under-test CT. If the count value CNT exceeds the predetermined range (or is higher than a predetermined value), it indicates that the capacitor under-test CT is touched to have a capacitance value change.

Figure 3A:
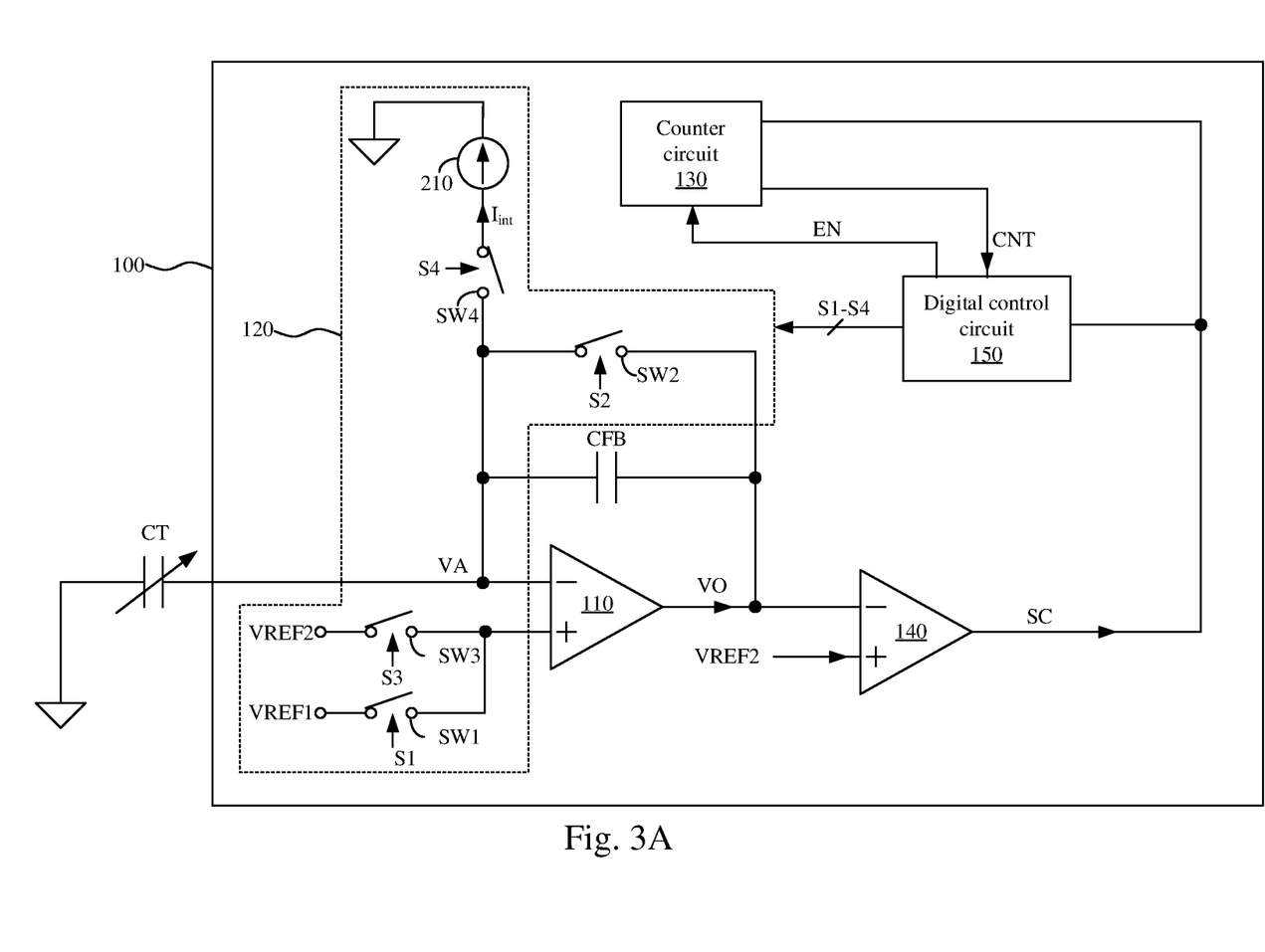
FIG. 3A illustrates a circuit diagram of the capacitive sensing device in FIG. 1 according to some embodiments of the present disclosure.

FIG. 3A illustrates a circuit diagram of the capacitive sensing device 100 in FIG. 1 according to some embodiments of the present disclosure. Compared with FIG. 2A, in this example, the reference voltage VREF2 is lower than the reference voltage VREF1, and the switch circuitry 120 is configured to drain the current $I_{int}$ from the negative input terminal of the amplifier circuit 110 to ground during the third phase, in order to adjust the output voltage VO.

In greater detail, different from the current source circuit 210 in FIG. 2A, in this example, the current source circuit 210 is coupled from the negative input terminal of the amplifier circuit 110 to ground via the switch SW4 to drain the current $I_{int}$ from the negative input terminal of the amplifier circuit 110 to ground, in order to adjust the output voltage VO.

Figure 3B:
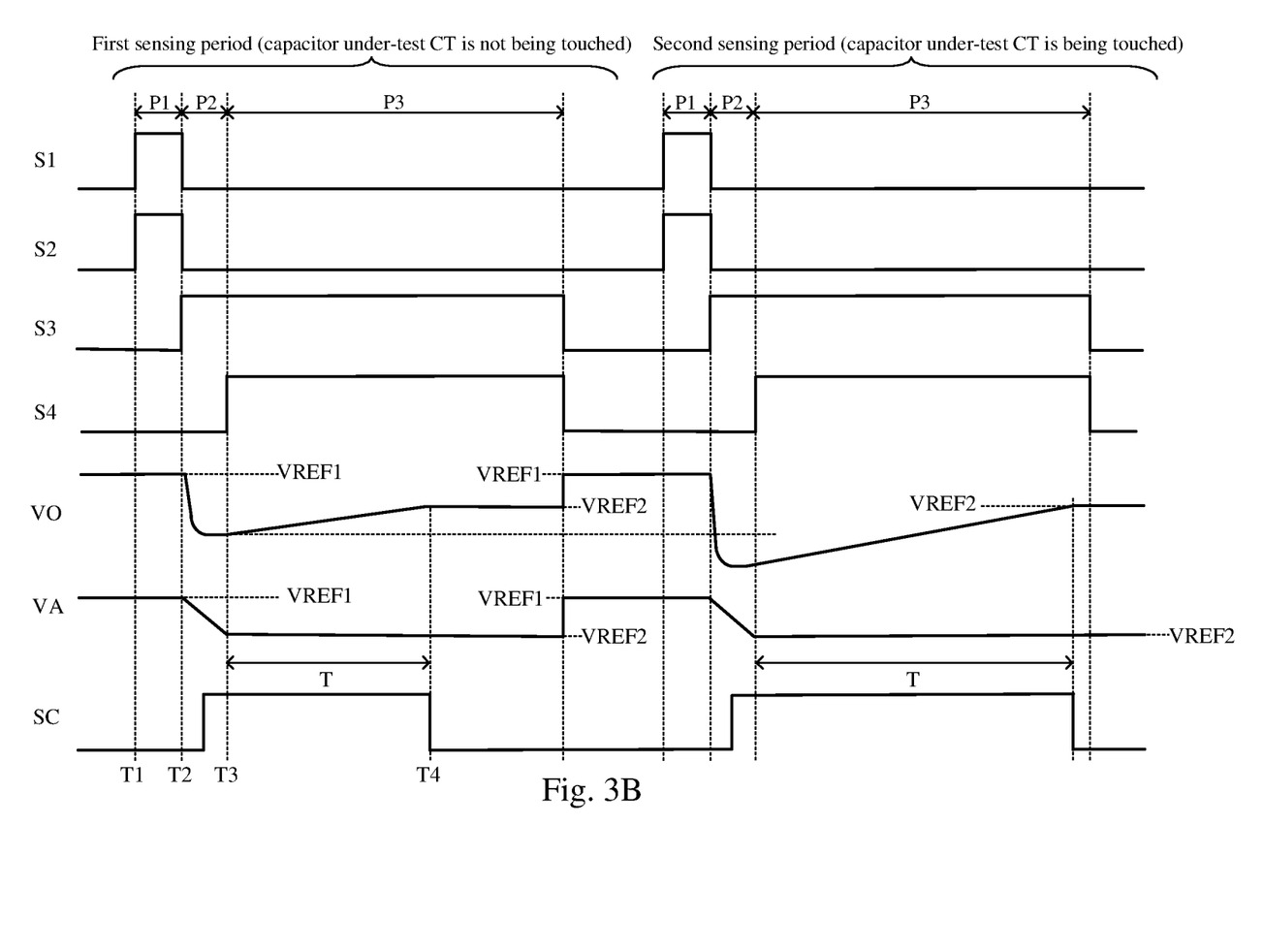
FIG. 3B illustrates a schematic diagram of waveforms of signals and voltages in FIG. 3A according to some embodiments of the present disclosure.

FIG. 3B illustrates a schematic diagram of waveforms of signals and voltages in FIG. 3A according to some embodiments of the present disclosure. Similar to FIG. 2B, FIG. 3B shows two consecutive sensing periods, in which the capacitor under-test CT is not being touched during the first sensing period (i.e., the capacitance value is unchanged), and is being touched during the second sensing period (i.e., the capacitance value is changed. As mentioned above, in examples of FIG. 3A, the reference voltage VREF2 is set to be lower than the reference voltage VREF1. Accordingly, the comparator circuit 140 outputs the control signal SC having the low level when the output voltage VO is equal to or higher than the reference voltage VREF2, and thus the counter circuit 130 may be configured to stop counting in response to the control signal SC having the low level.

As the reference voltage VREF2 is lower than the reference voltage VREF1, during the phase P2, the output voltage VO is getting lower from the reference voltage VREF1. During the phase P3, with the adjustment of the current source circuit 210, the level of the output voltage VO is increased gradually to be equal to or higher than the reference voltage VREF2. Operations of switches SW1-SW4 and the changes of amount of the charges in each of the capacitor under-test CT and the feedback capacitor CFB are similar to those in FIG. 2B, and thus the repetitious descriptions are not further given. In this example, the period T is a period from when the switch SW4 starts being turned on to when the output voltage VO is adjusted to be equal to or higher than the reference voltage VREF2. In FIG. 3B, if the capacitor under-test CT is being touched to have a higher capacitance value, the output voltage VO is decreased to a lower level during the phase P2. Accordingly, the phase P3, it takes more time for the output voltage VO being increased to the reference voltage VREF2. In other words, the time length of the period T is longer, and the value of the count value CNT is higher. As a result, it is able to determine whether the capacitance value of the capacitor under-test CT changes according to the count value CNT. Detailed operations and charges distributions in FIG. 3B are similar to those in FIG. 2B, and thus the repetitious descriptions are not further given.

Figure 4:
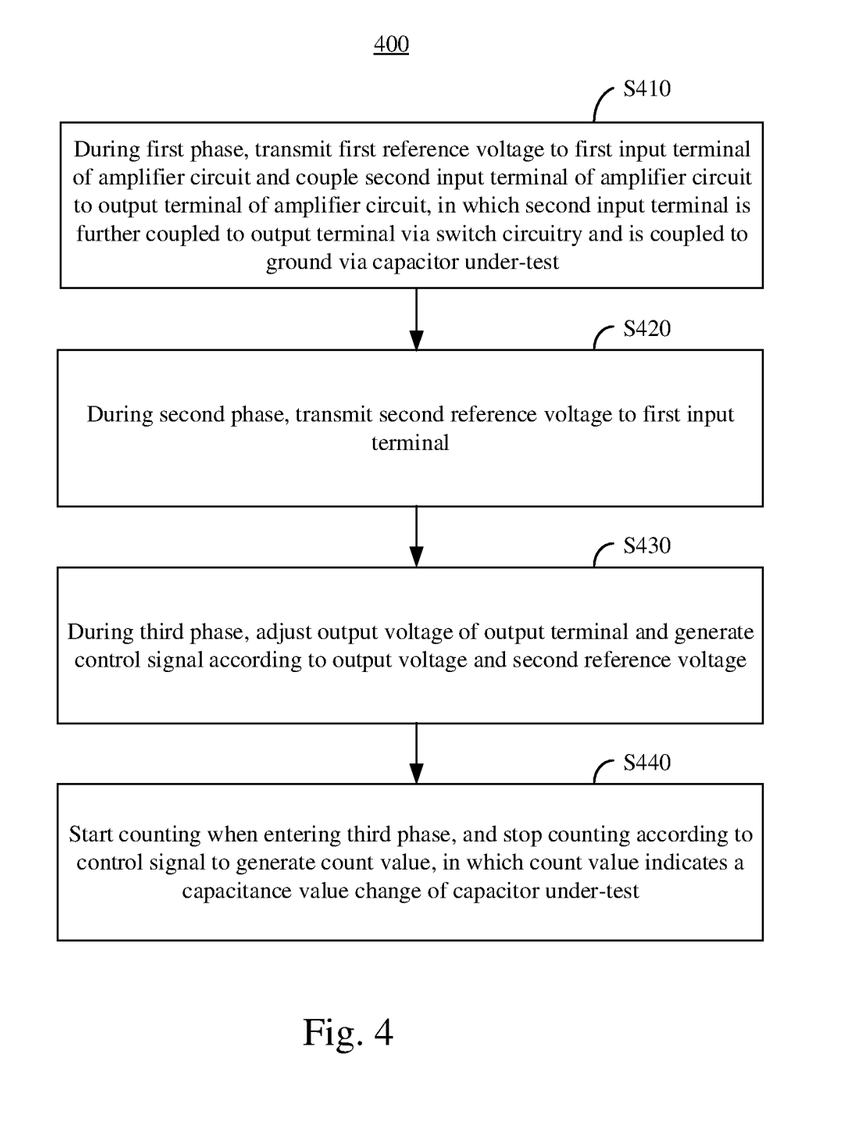
FIG. 4 illustrates a flow chart of a capacitive sensing method according to some embodiments of the present disclosure.

FIG. 4 illustrates a flow chart of a capacitive sensing method 400 according to some embodiments of the present disclosure. In operation S410, during a first phase, a first reference voltage is transmitted to a first input terminal of an amplifier circuit and a second input terminal of the amplifier circuit is coupled to an output terminal of the amplifier circuit, in which the second input terminal is further coupled to the output terminal via a switch circuitry and is coupled to ground via a capacitor under-test. In operation S420, a second reference voltage is transmitted to the first input terminal during a second phase. In operation S430, during a third phase, an output voltage of the output terminal is adjusted and a control signal is generated according to the output voltage and the second reference voltage. In operation S440, counting is started when entering the third phase and is stopped according to the control signal to generate a count value, in which the count value indicates a capacitance value change of the capacitor under-test.

The above operations of the capacitive sensing method 400 can be understood with reference to above embodiments, and thus the repetitious descriptions are not further given. The above description of the capacitive sensing method 400 includes exemplary operations, but the operations of the capacitive sensing method 400 are not necessarily performed in the order described above. Operations of the capacitive sensing method 400 may be added, replaced, changed order, and/or eliminated, or the operations of the capacitive sensing method 400 may be executed simultaneously or partially simultaneously as appropriate, in accordance with the spirit and scope of various embodiments of the present disclosure.

As described above, the capacitive sensing device and the capacitive sensing method provided in some embodiments of the present disclosure may utilize a counter to generate a count value that is able to indicate whether a capacitance value of the capacitor under-test changes. As a result, it is able to monitor the count value to determine whether the capacitor under-test is being touched.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

The aforementioned descriptions represent merely some embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. A capacitive sensing device, comprising:
   an amplifier circuit, wherein a first input terminal of the amplifier circuit is coupled to a capacitor under-test;
   a feedback capacitor coupled between the first input terminal and an output terminal of the amplifier circuit;
   a switch circuitry configured to transmit a first reference voltage to a second input terminal of the amplifier circuit and couple the first input terminal to the output terminal during a first phase, transmit a second reference voltage to the second input terminal during a second phase, and adjust an output voltage of the output terminal during a third phase;
   a counter circuit configured to start counting during the third phase and stop counting according to a control signal to generate a count value, wherein the count value indicates a capacitance value change of the capacitor under-test; and
   a comparator circuit configured to generate the control signal according to the output voltage and the second reference voltage during the third phase.

2. The capacitive sensing device of claim 1, wherein the first reference voltage is lower than the second reference voltage, and the switch circuitry is configured to transmit a current to the first input terminal to adjust the output voltage during the third phase.

3. The capacitive sensing device of claim 1, wherein the second reference voltage is lower than the first reference voltage, and the switch circuitry is configured to drain a current from the first input terminal to ground to adjust the output voltage during the third phase.

4. The capacitive sensing device of claim 1, wherein the switch circuitry comprises:
   a first switch configured to be turned on during the first phase, in order to transmit the first reference voltage to the second input terminal;
   a second switch configured to be turned on during the first phase, in order to couple the first input terminal to the output terminal;
   a third switch configured to be turned on during the second phase, in order to transmit the second reference voltage to the second input terminal;
   a current source circuit; and
   a fourth switch configured to be turned on during the third phase, in order to couple the current source circuit to the first input terminal to adjust the output voltage.

5. The capacitive sensing device of claim 4, wherein the first reference voltage is lower than the second reference voltage, and the current source circuit is configured to transmit a current to the first input terminal via the fourth switch.

6. The capacitive sensing device of claim 4, wherein the second reference voltage is lower than the first reference voltage, and the current source circuit is configured to drain a current from the first input terminal to ground via the fourth switch.

7. The capacitive sensing device of claim 4, wherein the first switch and the second switch are not turned on during the second phase.

8. The capacitive sensing device of claim 4, wherein the third switch is continuously turned on during the third phase.

9. The capacitive sensing device of claim 1, wherein the capacitance value change of the capacitor under-test is proportional to the count value.

10. The capacitive sensing device of claim 1, wherein the count value indicates a time length of a period from when the counter circuit starts counting to when the output voltage is lower than or equal to the second reference voltage, or indicates a time length of a period from when the counter circuit starts counting to when the output voltage is higher than or equal to the second reference voltage.

11. The capacitive sensing device of claim 1, wherein the count value is proportional to a voltage difference between the first reference voltage and the second reference voltage.

12. The capacitive sensing device of claim 1, wherein the first input terminal and the output terminal of the amplifier circuit have the same level during the first phase.

13. A capacitive sensing method, comprising:
    transmitting a first reference voltage to a first input terminal of an amplifier circuit and coupling a second input terminal of the amplifier circuit to an output terminal the amplifier circuit during a first phase, wherein the second input terminal is coupled to the output terminal via a switch circuitry and is coupled to ground via a capacitor under-test;
    transmitting a second reference voltage to the first input terminal during a second phase;
    adjusting an output voltage of the output terminal and generating a control signal according to the output voltage and the second reference voltage during a third phase; and
    starting counting when entering the third phase and stopping counting according to the control signal to generate a count value, wherein the count value indicates a capacitance value change of the capacitor under-test.

14. The capacitive sensing method of claim 13, wherein the first reference voltage is lower than the second reference voltage, and adjusting the output voltage of the output terminal and generating the control signal according to the output voltage and the second reference voltage during the third phase comprises:
    transmitting a current to the second input terminal to adjust the output voltage during the third phase.

15. The capacitive sensing method of claim 13, wherein the second reference voltage is lower than the first reference voltage, and adjusting the output voltage of the output terminal and generating the control signal according to the output voltage and the second reference voltage during the third phase comprises:
    draining a current from the second input terminal to ground to adjust the output voltage during the third phase.

16. The capacitive sensing method of claim 13, wherein the capacitance value change of the capacitor under-test is proportional to the count value.

17. The capacitive sensing method of claim 13, wherein the count value indicates a time length of a period from starting counting to when the output voltage is lower than or equal to the second reference voltage, or indicates a time length of a period from starting counting to when the output voltage is higher than or equal to the second reference voltage.

18. The capacitive sensing method of claim 13, wherein the count value is proportional to a voltage difference between the first reference voltage and the second reference voltage.

19. The capacitive sensing method of claim 13, wherein the second input terminal and the output terminal of the amplifier circuit have the same level during the first phase.

20. The capacitive sensing method of claim 13, wherein the first reference voltage and the second reference voltage are not transmitted to the second input terminal during the second phase.

* * * * *